US011117095B2

(12) United States Patent
Stolzman et al.

(10) Patent No.: US 11,117,095 B2
(45) Date of Patent: Sep. 14, 2021

(54) CONVERSION EQUIPMENT FOR FLUE GAS DESULFURIZATION SYSTEMS AND METHODS OF CONVERTING CALCIUM-BASED FLUE GAS DESULFURIZATION SYSTEMS

(71) Applicant: Marsulex Environmental Technologies Corporation, Lebanon, PA (US)

(72) Inventors: Barry Wayne Stolzman, Nazareth, PA (US); Michael Lyn Mengel, Fredericksburg, PA (US); Michael Tom Hammer, Birdsboro, PA (US)

(73) Assignee: Marsulex Environmental Technologies Corporation, Lebanon, PA (US)

( * ) Notice: Subject to any disclaimer, the term of this patent is extended or adjusted under 35 U.S.C. 154(b) by 0 days.

(21) Appl. No.: 17/140,451

(22) Filed: Jan. 4, 2021

(65) Prior Publication Data

US 2021/0129077 A1    May 6, 2021

Related U.S. Application Data

(62) Division of application No. 16/154,337, filed on Oct. 8, 2018, now Pat. No. 10,882,006.

(60) Provisional application No. 62/569,494, filed on Oct. 7, 2017.

(51) Int. Cl.
*B01D 53/50* (2006.01)
*C01C 1/24* (2006.01)

(52) U.S. Cl.
CPC ......... *B01D 53/502* (2013.01); *B01D 53/504* (2013.01); *C01C 1/24* (2013.01); *B01D 2251/2062* (2013.01); *B01D 2258/0283* (2013.01)

(58) Field of Classification Search
None
See application file for complete search history.

(56) References Cited

PUBLICATIONS

Lu et al. Ammonia-Based Flue Gas Desulfurization. Power Engineering. Issue 7, vol. 121. pp. 1-15. https://www.power-eng.com/emissions/ammonia-based-flue-gas-desulfurization/#gref (Year: 2017).*

* cited by examiner

*Primary Examiner* — Jelitza M Perez
(74) *Attorney, Agent, or Firm* — Hartman Global IP Law; Gary M. Hartman; Domenica N. S. Hartman

(57) ABSTRACT

Conversion methods and equipment for converting a calcium-based flue gas desulfurization (FGD) system to an ammonia-based FGD systems, including modifying a reagent system and absorber system of the calcium-based FGD system to be capable of, respectively, delivering an ammonia-based reagent to the absorber system rather than the calcium-based reagent, and modifying the absorber system to increase capacity of a reaction tank thereof.

6 Claims, 5 Drawing Sheets

CONVERSION EQUIPMENT FOR FLUE GAS DESULFURIZATION SYSTEMS AND METHODS OF CONVERTING CALCIUM-BASED FLUE GAS DESULFURIZATION SYSTEMS

CROSS REFERENCE TO RELATED APPLICATIONS

This application is a division patent application of co-pending U.S. patent application Ser. No. 16/154,337 filed Oct. 8, 2018, which claims the benefit of U.S. Provisional Application No. 62/569,494 filed Oct. 7, 2017. The contents of these prior applications are incorporated herein by reference.

BACKGROUND OF THE INVENTION

The present invention generally relates to equipment and processes for desulfurizing a gas mixture. The invention particularly relates to methods and equipment for converting calcium-based flue gas desulfurization (FGD) systems to ammonia-based FGD systems.

Gas-liquid contactors and absorbers are widely used to remove substances such as gases and particulate matter from combustion or flue gases produced by utility and industrial plants. Often of particular concern are sulfur dioxide ($SO_2$) and other acidic gases produced by the combustion of fossil fuels and various industrial operations. Such gases are known to be hazardous to the environment, and their emission into the atmosphere is regulated by clean air statutes. Methods by which these gases are removed with gas-liquid contactors and absorbers have been referred to as wet flue gas desulfurization (FGD).

The cleansing action produced by a gas-liquid contactor is generally derived from the passage of gas through a tower cocurrently or countercurrently to a descending liquid that cleans the gas. Wet flue gas desulfurization processes have typically involved the use of calcium-based slurries or sodium-based or ammonia-based solutions. Examples of calcium-based slurries are limestone (calcium carbonate; $CaCO_3$) slurries and hydrated lime (calcium hydroxide; $Ca(OH)_2$) slurries formed by action of water on lime (calcium oxide; CaO). Such alkaline slurries react with the acidic gases to form precipitates that can be collected for disposal or recycling. Intimate contact between the alkaline slurry and acidic gases that are present in the flue gases, such as sulfur dioxide, hydrogen chloride (HCl) and hydrogen fluoride (HF), result in the absorption of the gases by the slurry and the formation of salts such as, in the case of calcium-based slurries, calcium sulfite ($CaSO_3 \cdot \frac{1}{2}H_2O$), calcium sulfate (gypsum, $CaSO_4 \cdot 2H_2O$), calcium chloride ($CaCl_2$), and calcium fluoride ($CaF_2$). Forced oxidation of the slurry by aeration is often employed to ensure that all of the sulfites will be reacted to form sulfates, which in the case of a calcium-based slurry serves to maximize the production of gypsum.

While gas-liquid contactors and absorbers utilizing calcium-based (e.g., limestone or lime) slurries as described above are widely used and generally perform satisfactorily, their operation results in the production of large quantities of wastes or gypsum, the latter often having only nominal commercial value. In addition, the chemical reactions and the reactivity of the calcium-based reagents vary widely. In contrast, ammonia-based scrubbing processes produce a more valuable ammonium sulfate fertilizer. In these processes, sulfur dioxide within the flue gas reacts with ammonia ($NH_3$) to form an ammonium sulfate solution or ammonium sulfate crystals (($NH_4)_2SO_4$). A particular example of such a process is disclosed in U.S. Pat. No. 5,362,458 and results in the production of ammonium sulfate fertilizer by reacting sulfur dioxide and free ammonia ($NH_3$) in an ammonia-containing scrubbing solution. Even so, calcium-based FGD systems remain in wide use because of the challenges and prohibitive costs of replacing them with other FGD systems that produce more valuable byproducts, such as ammonia-based FGD systems.

In view of the above, it can be appreciated that it would be desirable if it were practical to convert existing calcium-based FGD systems to FGD systems that yield a more commercially valuable byproduct.

BRIEF DESCRIPTION OF THE INVENTION

The present invention provides conversion methods and equipment that provide an economical means for converting a calcium-based flue gas desulfurization (FGD) system to an ammonia-based FGD systems.

According to one aspect of the invention, conversion equipment for an FGD system is provided that includes a reagent system for preparing an ammonia-based reagent, an absorber system that includes an absorber tower that uses an ammonia-based slurry to remove sulfur dioxide from a flue gas, a reaction tank in which a reaction occurs between the ammonia-based reagent and the sulfur dioxide absorbed by the ammonia-based slurry to produce an ammonium sulfate byproduct, and a dewatering system for drying the ammonium sulfate byproduct to isolate the ammonium sulfate byproduct from the ammonia-based slurry.

According to another aspect of the invention, a method of converting an existing calcium-based FGD system to an ammonia-based FGD system is provided. The calcium-based FGD system includes a reagent system for preparation of a calcium-based reagent, an absorber system that includes an absorber tower that uses a calcium-based slurry to remove sulfur dioxide from a flue gas and a reaction tank in which a reaction occurs between the calcium-based reagent and the sulfur dioxide absorbed by the calcium-based slurry to produce a calcium-based byproduct, and a dewatering system for drying the calcium-based slurry to isolate the calcium-based byproduct therefrom. The method includes modifying the reagent system to be capable of delivering an ammonia-based reagent to the absorber system rather than the calcium-based reagent, and modifying the absorber system to increase capacity of the reaction tank.

Technical effects of the system and method described above preferably include the capability of converting an existing calcium-based FGD system to an ammonia-based FGD system that yields ammonium sulfate as a byproduct, which currently has a significantly higher resale value than byproducts such as gypsum.

Other aspects and advantages of this invention will be further appreciated from the following detailed description.

DETAILED DESCRIPTION OF THE INVENTION

Disclosed herein are ammonia-based systems capable of removing sulfur dioxide ($SO_2$) from a gas, for example, a flue gas of an industrial process. Further disclosed herein are conversion equipment and methods suitable for converting conventional calcium-based FGD systems to ammonia-based FGD systems. Although the invention will be described hereinafter in reference to FGD systems, it is foreseeable and within the scope of the invention that the teachings disclosed herein may be applicable for the removal of acidic gases using other types of systems.

Ammonia-based FGD systems provide desirable desulfurization of flue gasses while generating a byproduct, typically ammonium sulfate, that has an economic value many times that of calcium byproducts conventionally produced by calcium-based FGD systems. These ammonia-derived byproducts can be utilized, for example, in the agricultural industry as well as the ornamental plant and turf industry as a fertilizer. The ability to convert existing and widely-used calcium-based FGD systems to ammonia-based FGD systems in part addresses the current agricultural demand for an increased sulfur content in fertilizers. The methods of conversion disclosed herein are applicable to a wide variety of different FGD absorber tower designs. Unlike conventional upgrades or retrofits to existing calcium-based FGD systems which were typically intended to improve $SO_2$ removal efficiencies while maintaining the same calcium reagent, the methods disclosed herein are used to convert existing FGD systems to use ammonia as a reagent, instead of lime or limestone. In doing so, the disclosed conversion equipment and methods must address significant differences in equipment requirements that arise due to there being significant differences in the chemical processes performed by calcium-based and ammonia-based FGD systems.

Figure 1:
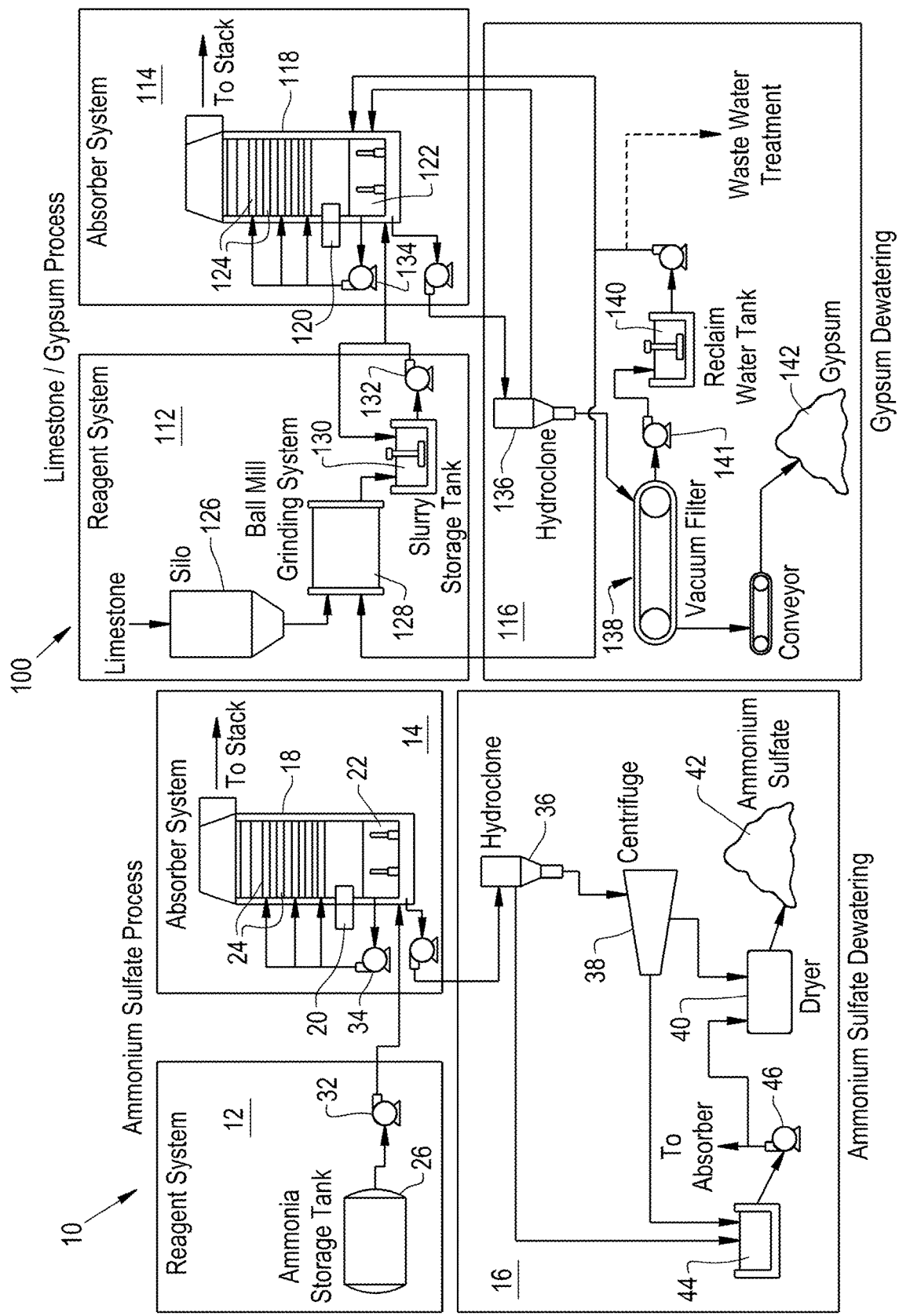
FIG. 1 schematically represents a side-by-side comparison of an ammonia-based FGD system ("Ammonium Sulfate Process") and a calcium-based FGD system ("Limestone/Gypsum Process") of types known in the art.

FIG. 1 schematically represents a side-by-side comparison of an ammonia-based FGD system ("Ammonium Sulfate Process") 10 and a conventional calcium-based FGD system ("Limestone/Gypsum Process") 100. For the purpose of explanation, these systems 10 and 100 are each separated into three subsystems, namely, a reagent system 12 or 112 for preparation of the different reagents used by the FGD systems 10 and 100, an absorber system 14 or 114 that utilizes a slurry (liquor) containing the reagent to remove $SO_2$ (and likely other constituents) from a flue gas, and a dewatering system 16 or 116 for obtaining a dry byproduct from the slurry. During operation of either FGD system 10 or 100, an $SO_2$-laden gas stream enters an absorber tower 18 or 118 of the absorber system 14 or 114 through an inlet 20 or 120. A quantity of the slurry is contained in a reaction tank 22 or 122 located at a lower end of the absorber tower 18 or 118, from which the slurry is recycled within the absorber system 14 or 114 with a pump 34 and 134 that continuously draws the slurry from the tank 22 or 122 and introduces the slurry via spray nozzles 24 or 124 at locations within the absorber tower 18 or 118 above the tank 22 or 122. The slurry contacts and preferably absorbs $SO_2$ from the gas stream flowing upward through the absorber tower 18 or 118. The resulting $SO_2$-laden slurry falls into the reaction tank 22 or 122, where the reagent from the reagent system 12 or 112 is introduced to neutralize and react with the $SO_2$ absorbed in the slurry to produce one or more byproducts. A portion of the slurry is pumped from the reaction tank 22 or 122 to the dewatering system 16 or 116, where the byproducts can be isolated by drying the slurry.

The calcium-based FGD system 100 of FIG. 1 is represented as using limestone as the reagent, and the resulting byproduct is oxidized to generate gypsum 142 generally according to the following.

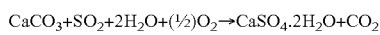

The ammonia-based FGD system 10 of FIG. 1 is represented as using ammonia as the reagent, in either an anhydrous ($NH_3$) or aqueous form (ammonium hydroxide), and generates ammonium sulfate 42 as a byproduct generally according to the following.

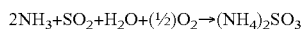

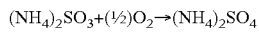

Figure 4:
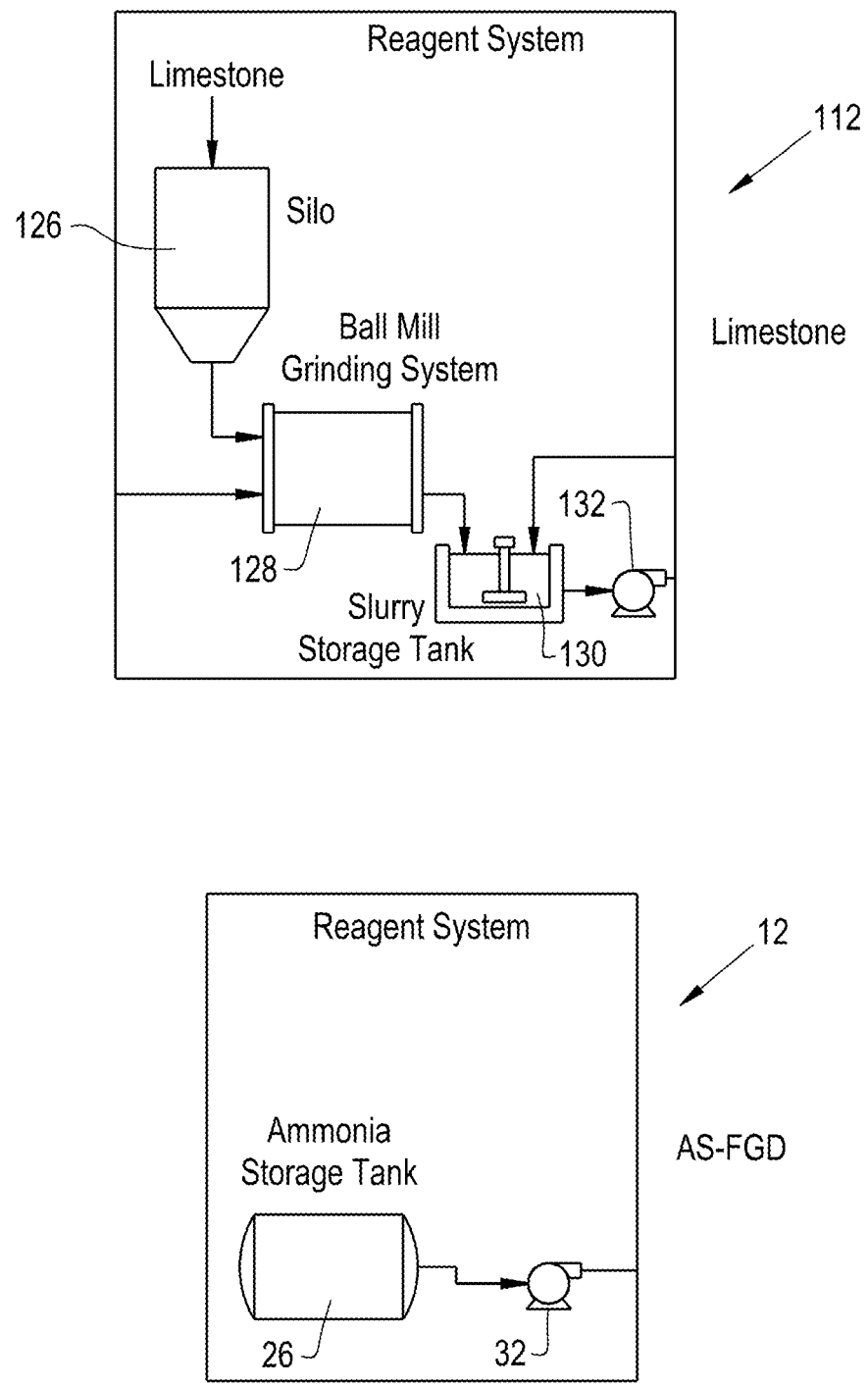
FIG. 4 schematically represents an isolated comparison of reagent systems of the ammonia-based and calcium-based FGD systems of FIG. 1.

Conventional calcium-based FGD systems, such as the system 100 represented in FIG. 1, usually require a fairly complex reagent system 112 for the preparation of a limestone slurry. For example, FIGS. 1 and 4 depict the reagent system 112 of the calcium-based FGD system 100 as comprising a limestone storage silo 126, a wet ball mill grinding system 128, a limestone slurry storage tank 130, and a limestone slurry feed pump 132 that delivers the limestone slurry to the reaction tank 122 within the absorber tower 118. As shown in FIGS. 1 and 4, the silo 126, grinding system 128, slurry storage tank 130, slurry feed pump 132, and reaction tank 122 are all connected with piping. Though not shown, the reagent system 112 of the calcium-based FGD system 100 also typically requires a weigh feeder, a cyclone classifier, a ball mill product sump with an agitator, and ball mill product pumps.

In comparison, FIGS. 1 and 4 depict the reagent system 12 of the ammonia-based FGD system 10 as considerably simpler. FIGS. 1 and 4 depict an ammonia storage tank 26, an ammonia feed pump 32, and piping that deliver the ammonia directly from the storage tank 26 to the reaction tank 22 within the absorber tower 18, without any intervening grinding or storage equipment. Though not shown, the reagent system 12 of the ammonia-based FGD system 10 may optionally include a vaporizer, for example, if an anhydrous ammonia supply is used.

In view of the above, the conversion of a conventional calcium-based FGD system 100 to an ammonia-based FGD system 10 includes removing most if not all of the reagent system 112 of the calcium-based FGD system 100, and replacing it with conversion equipment that includes an ammonia storage tank 26 and an ammonia feed pump 32 that deliver ammonia to the reaction tank 22 within the absorber tower 18. The reagent system 12 depicted in FIGS. 1 and 4 may be in the form of a prefabricated unit that can be installed at the location within the FGD system 100 previously occupied by the original reagent system 112.

Figure 3:
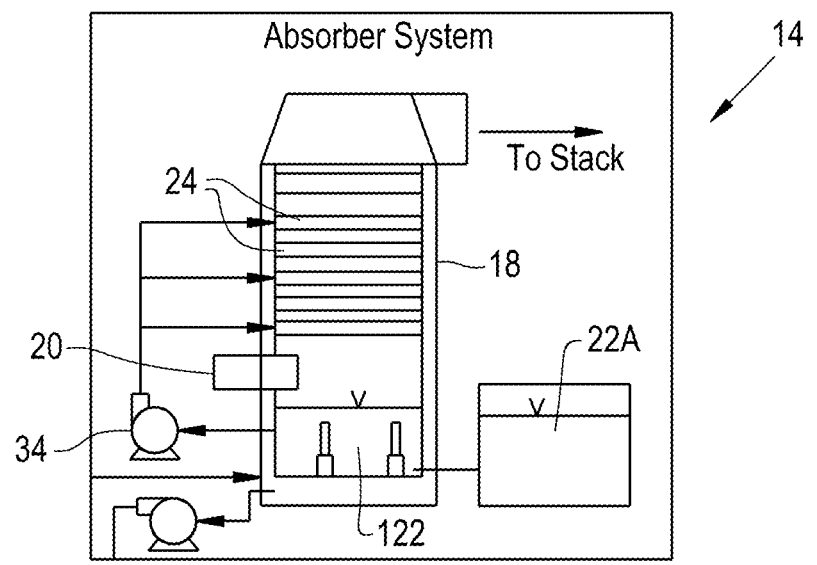
FIG. 3 schematically represents an isolated comparison of absorber systems of the ammonia-based and calcium-based FGD systems of FIG. 1.
Figure 3:
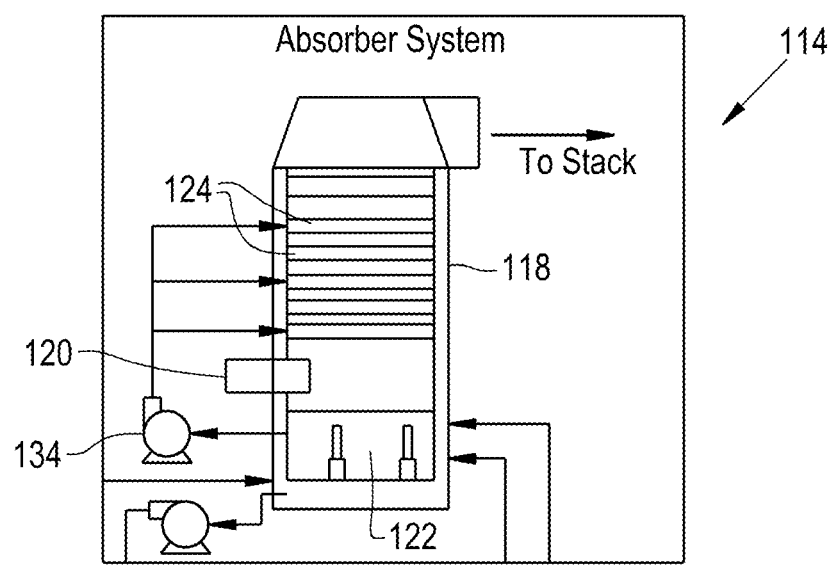

As shown in FIGS. 1 and 3, the absorber systems 14 and 114 of both the calcium-based and the ammonia-based FGD systems 10 and 100 may include similar components. For example, the absorber towers 18 and 118, recycle pumps 34 and 134, and spray nozzles 24 and 124 appear to be similar. However, there are significant differences in these components relating to process design factors and the selection of materials for their construction. Process chemistry and process control factors may also differ. Particular differences include the capacity of the reaction tank 22 of the ammonia-based FGD system 10, which is preferably significantly larger than the reaction tank 122 of a calcium-based FGD system 100 in order to accommodate the slower rate of oxidation for ammonium sulfate relative to limestone in the above-noted reactions. As such, the conversion of a conventional calcium-based FGD system 100 to an ammonia-based FGD system 10 includes replacing the reaction tank 122 with a larger replacement reaction tank 22 and/or, as represented in FIG. 3, fluidically coupling an external reaction tank 22A to the existing reaction tank 122 to equip the absorber system 14 with an increased reactive capacity.

Other differences between the absorber systems 14 and 114 of the two FGD systems 10 and 100 may include operating the ammonia-based FGD system 10 at a higher specific gravity than typical for calcium-based FGD systems 100. Also, chloride concentrations in the slurry may be higher when operating as an ammonia-based FGD system 10.

In view of the above, the conversion of a conventional calcium-based FGD system 100 to an ammonia-based FGD system 10 entails modifications to the existing absorber system 14 to include a larger reaction tank 22 or the addition of an external reaction tank 22A connected to the existing reaction tank 122, as well as additional or larger-capacity oxidation air blowers (not shown) to take into account the slower rate of oxidation of ammonium sulfate. In addition or alternatively, oxidation agents such as hydrogen peroxide and/or catalysts can be utilized to optimize the larger tank 22 and/or external reaction tank 22A for oxidation purposes. The larger reaction tank 22 and, if included, the external reaction tank 22A are preferably constructed of materials that are better suited for exposure to an ammonium sulfate slurry.

Figure 5:
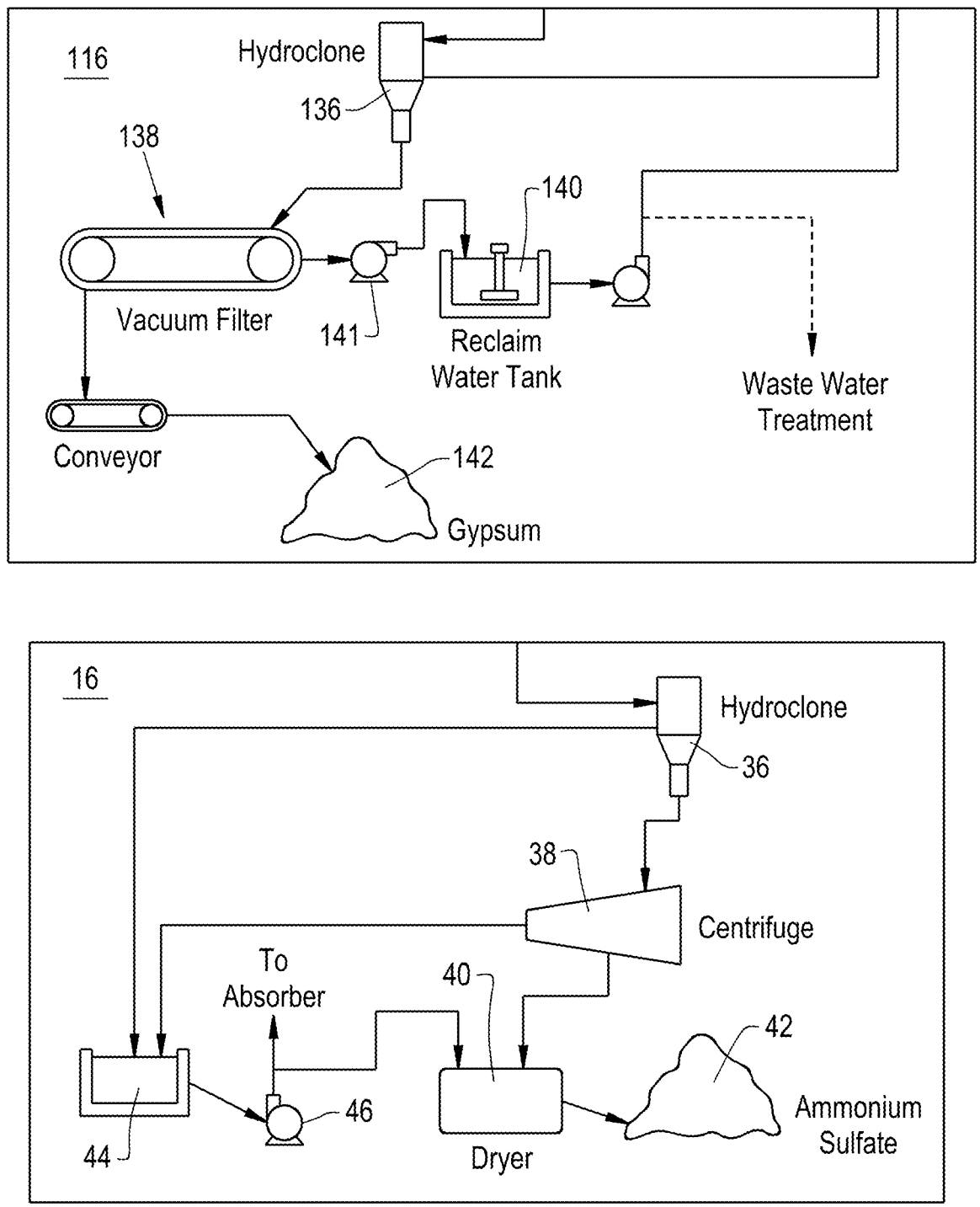
FIG. 5 schematically represents an isolated comparison of dewatering systems of the ammonia-based and calcium-based FGD systems of FIG. 1.

For byproduct dewatering, both FGD systems 10 and 100 represented in FIG. 1 include a hydroclone 36 and 136 used for primary dewatering. As shown in FIGS. 1 and 5, the ammonia-based FGD system 10 generally employs at least one centrifuge 38 based on their ability to produce a low moisture cake and smaller plot area requirement. In some applications, depending on the expected concentrations of $SO_2$ in the flue gas and chlorides in the scrubbing slurry, an additional external crystallization system (not shown) may be required. The centrifuge 38 works in cooperation with one or more dryers 40 to generate a dry ammonium sulfate 42. FIG. 5 identifies the ammonia-based FGD system 10 as ideally being a ZLD (zero liquid discharge) facility, in which case all water removed by the hydroclone 36 and centrifuge 38 is directly or indirectly returned to the absorber tower 18 or its reaction tank 22, e.g., utilizing a collection tank 44 and pump 46. The chlorides in the process are controlled by directing a small purge water stream from the tank 44 to the dryer 40, which enables the recovery of additional ammonium sulfate product from the water removed by the hydroclone 36 and centrifuge 38.

In contrast, the calcium-based FGD system 100 shown in FIGS. 1 and 5 uses a belt or rotary drum vacuum filter system 138 to produce relatively dry gypsum, as higher moisture content in the byproduct gypsum 142 is usually acceptable. As seen in FIG. 1, waste water removed by the drying process is often discharged to a waste water treatment facility, though a fraction of the waste water may be recycled back to the limestone slurry in the reaction tank 122. In view of the above, the conversion of a conventional calcium-based FGD system 100 to an ammonia-based FGD system 10 typically includes the removal of the belt or rotary drum vacuum filter system 138 and in its place installing one or more centrifuges 38, and elimination of a waste water discharge and treatment facility.

Figure 2:
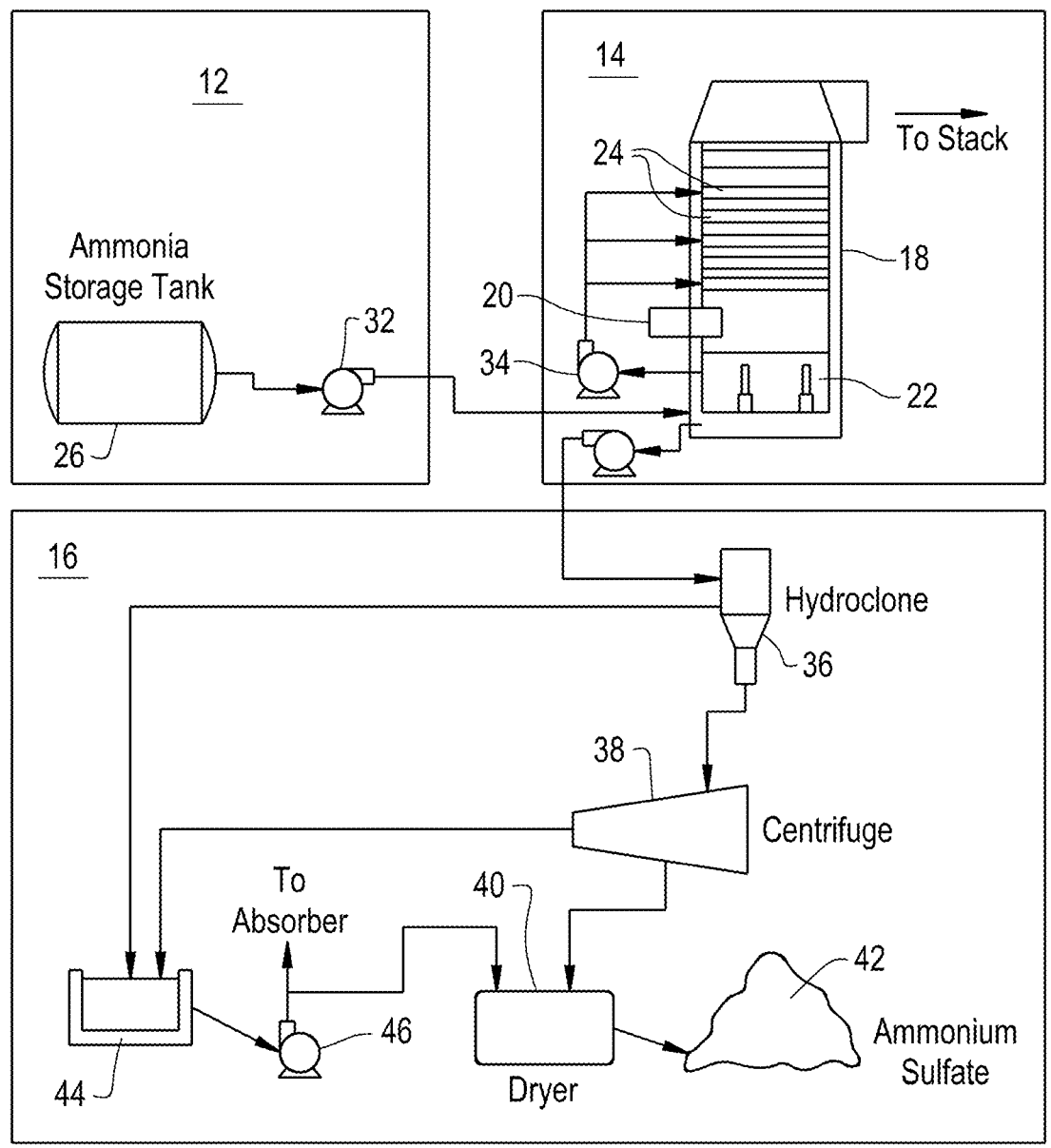
FIG. 2 schematically shows an isolated representation of the ammonia-based FGD system of FIG. 1.

In view of the above, the conversion of the existing calcium-based FGD system 100 of FIG. 1 to the ammonia-based FGD system 10 of FIGS. 1 and 2 necessitates the replacement and/or modification of various components of the existing system 100. For example, the entire existing reagent system 112 may be decommissioned and a new ammonia supply system 12 installed as a unit in its place. In the absorber system 114, the absorber tower 118 or its reaction tank 122 may optionally be replaced to provide a larger tank 22, and/or an external reaction tank 22A may be connected to the existing tank 122. Preferably, existing components such as oxidation blowers, agitators, and pumps 134 are evaluated and may require replacement to handle the higher specific gravity of an ammonium sulfate slurry. In the dewatering system 116, the existing hydroclone 136 may be evaluated for re-use in the ammonia-based FGD system 10. The vacuum filter system 138 of the existing calcium-based FGD system 100 is preferably entirely replaced with one or more centrifuges 38 and dryers 30 to yield a drier byproduct. An existing reclaim water tank 140, pumps 141, and piping may also be evaluated for re-use (e.g., possible as the tank 44 and pump 46) or replaced if necessary. Various other components within the calcium-based FGD system 100 may be replaced with similar components formed of different materials or configured to operate at difference process parameters.

In general, the conversion of the calcium-based FGD system 100 to an ammonia-based FGD system 10 may include reusing as many of the existing components as possible. Such approach may not only reduce the cost of the conversion process, but preferably also replicate the general approach of the mature, conventional calcium-based FGD systems that have been refined over more than thirty years of commercial experience.

The systems and methods of conversion disclosed herein provide for ammonia-based FGD systems that generate an alternative and more valuable byproduct, ammonium sulfate, as compared to byproducts such as calcium sulfite or calcium sulfate of calcium-based FGD systems. This allows for additional beneficial production of a higher value byproduct (e.g., fertilizer) for an industry with high market demand (e.g., commercial agriculture).

While the invention has been described in terms of specific or particular embodiments, it should be apparent that alternatives could be adopted by one skilled in the art. For example, the ammonia-based FGD system 10 and its components could differ in appearance and construction from the embodiment described herein and shown in the drawings, functions of certain components of the ammonia-based FGD system 10 could be performed by components of different construction but capable of a similar (though not necessarily equivalent) function, and various materials could be used in the fabrication of the ammonia-based FGD system 10 and/or its components. Further, an existing calcium-based FGD system and its components may differ in appearance and construction from the example disclosed herein, and therefore the method of converting such a system to an ammonia-based FGD system 10 may comprise additional or fewer steps than those disclosed herein. In addition, the invention encompasses additional or alternative embodiments in which one or more features or aspects of a particular embodiment could be eliminated. Accordingly, it should be understood that the invention is not necessarily limited to any embodiment described herein or illustrated in the drawings. It should also be understood that the phraseology and terminology employed above are for the purpose of describing the disclosed embodiment, and do not necessarily serve as limitations to the scope of the invention. Therefore, the scope of the invention is to be limited only by the following claims.

The invention claimed is:

1. Conversion equipment for converting an existing calcium-based flue gas desulfurization (FGD) system to an ammonia-based FGD system, the existing calcium-based FGD system comprising an absorber tower that is adapted to use a calcium-based slurry to remove sulfur dioxide from a flue gas and has an upper portion in which the calcium-based slurry is introduced into the absorber tower and a reaction tank located at a lower end of the absorber tower, the conversion equipment comprising:
   a replacement reaction tank adapted to contain a reaction between an ammonia-based reagent and sulfur dioxide absorbed in an ammonia-based slurry to produce an ammonium sulfate byproduct, the replacement reaction tank being adapted for connection to the upper portion of the absorber tower of the existing calcium-based FGD system;
   a replacement reagent system comprising an ammonia storage tank, means for preparing the ammonia-based reagent, and means for delivering the ammonia-based reagent into the replacement reaction tank; and
   a dewatering system adapted to be fluidically coupled to the replacement reaction tank to receive the ammonia-based slurry from the replacement reaction tank, the dewatering system being adapted to isolate the ammonium sulfate byproduct from the ammonia-based slurry and dry the ammonium sulfate byproduct.

2. The conversion equipment of claim 1, wherein the replacement reaction tank comprises an external reaction tank and means for fluidically coupling the external reaction tank to the reaction tank of the existing calcium-based FGD system.

3. The conversion equipment of claim 1, wherein the replacement reaction tank is adapted for entirely replacing the reaction tank of the existing calcium-based FGD system and direct connection to the upper portion of the absorber tower of the existing calcium-based FGD system.

4. The conversion equipment of claim 1, wherein the replacement reagent system comprises an ammonia feed pump and piping that delivers the ammonia-based reagent to the replacement reaction tank.

5. The conversion equipment of claim 1, wherein the dewatering system comprises at least one centrifuge and at least one dryer.

6. The conversion equipment of claim 1, wherein the dewatering system comprises equipment that returns all water removed by the dewatering system to the absorber tower or the replacement reaction tank.

* * * * *